United States Patent [19]

Cochrum et al.

[11] 3,875,780

[45] Apr. 8, 1975

[54] METHOD OF MAKING A THREAD FORMING SCREW

[75] Inventors: William A. Cochrum, Roselle; Paul R. Lathom; William E. Orman, both of Rockford, all of Ill.

[73] Assignee: Rockford Headed Products, Inc., Rockford, Ill.

[22] Filed: Jan. 3, 1974

[21] Appl. No.: 430,489

[52] U.S. Cl. .................. 72/90; 72/469; 151/22; 85/47
[51] Int. Cl. ............................................. B21h 3/06
[58] Field of Search .......... 72/469, 88, 90; 10/10 R; 85/46, 47

[56] References Cited
UNITED STATES PATENTS

| | | | |
|---|---|---|---|
| 3,180,126 | 4/1965 | Carlson | 72/88 |
| 3,195,156 | 7/1965 | Phipard, Jr. | 10/10 R |
| 3,472,119 | 10/1969 | Peterson, Jr. | 85/47 |
| 3,803,889 | 4/1974 | Muenchinger | 72/88 |

*Primary Examiner*—Milton S. Mehr
*Attorney, Agent, or Firm*—Morsbach & Pillote

[57] ABSTRACT

A method of making a thread forming screw of penta-lobular cross-section having a straight shank portion and a tapered work entering end portion comprising, forming a headed blank with a straight shank of uniform penta-lobular cross-sectional shape and size from the head to the tip of the shank and then rolling the straight shank on a centerless basis between contoured thread rolling dies having a straight thread forming die surfaces that engage the main shank portion and tapered thread forming die surfaces that engage the work entering end portion. The straight thread forming die surfaces are maintained spaced apart a distance such that the crest of the threads rolled on the lobes of the main shank portion do not fill the roots of the thread grooves in the straight die surfaces and the tapered thread forming die surfaces converge in a direction lengthwise of the shank toward the shank axis and roll threads on the work entering end portion of the blank having finished crests at the lobes that taper inwardly. The tapered thread forming die surfaces displace material from the work entering end portion of the shank into the thread grooves at the juncture of the straight and taper thread forming die surfaces to more completely fill the roots of the thread grooves in that region and form at least one size turn of penta-lobular cross-sectional configuration having crests at the lobes and sides which are respectively more completely finished and of greater radial height than the crests at the lobes and sides of the main shank portion.

The screw produced by the aforementioned method is characterized by a shank of penta-lobular cross-section throughout its length having a tapered work entering end portion with a sharply crested tapered helical thread; a main shank portion having slightly unfinished crests at the lobes and relatively wider unfinished crests at the sides, and a sizing portion intermediate the work entering and main shank portion comprising at least one turn having crests at the lobes and sides which are respectively more completely finished and of greater radial height than the crests at the lobes and sides of the main shank portion.

7 Claims, 16 Drawing Figures

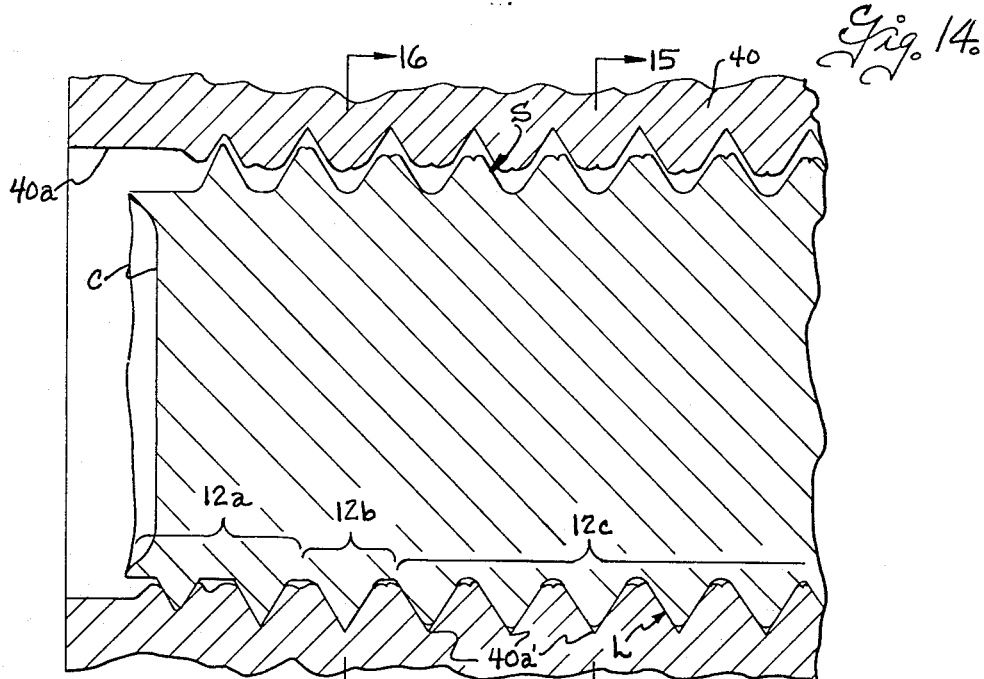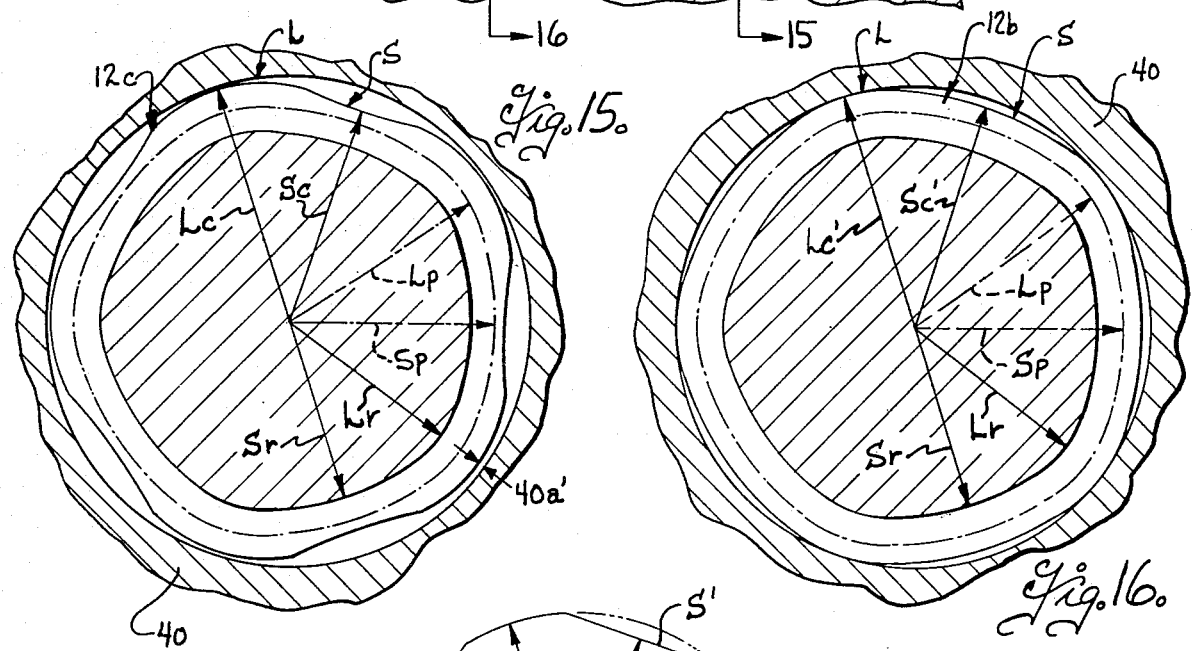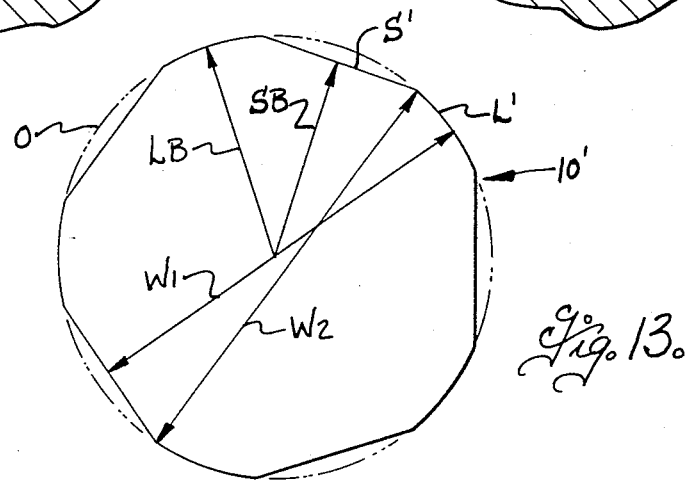

METHOD OF MAKING A THREAD FORMING SCREW

BACKGROUND OF THE INVENTION

It is heretofore been proposed, for example as shown in U.S. Pat. Nos. 2,352,982 and 3,195,156, to form self-tapping screws having a polygonal cross-section throughout the length of the threaded shanks so that the turns of the thread have circumferentially spaced lobes and intermediate sides that are radially relieved relative to the lobes such that the lobes form an internal thread in an opening in a workpiece by a swaging action, as contrasted to the cutting action. The lobular cross-sectional configuration of the screw having intermediate radially relieved sides provides space for material of the workpiece to flow, both circumferentially and axially, during swaging of the internal threads in the workpiece, and the intermediate relieved sides reduce the area of frictional contact between the screw threads and the workpiece so as to generally reduce the driving torque required to drive the screw into the workpiece. When screws made in accordance with the above patents are driven into a short hole, such as a hole in a strip of material, the driving torque reaches a maximum after the screw has advanced into the workpiece a distance to substantially fully form the thread in the hole, and then drops off somewhat. However, the torque required to continue advance such screws into the hole remains relatively high. There are application where it is very desirable to provide a screw having a low run-in torque, and it is desirable that this run-in torque be reached in the first or second revolution after maximum driving torque, or as close to the point end of the screw as possible. A typical example of such an application is an electrical terminal screw. The electrical screw requires a thread forming screw with low driving torque but which does not generate chips, since the presence of metallic chips would adversely effect most electrical equipment. Moreover, a low prevailing torque is desired so that the limited torque available for tightening the screw is advantageously used to provide increased clamping force, instead of merely overcoming resistance to turning of the screw in the workpiece.

When screws made in accordance with the aforementioned patents are driven into a long or blind hole, such as in a casting, the driving torque first builds up rapidly as the screw swages the internal threads adjacent the end of the hole, and the driving torque continues to build up because the work entering end of the screw continues to swage threads in the hole while the shank portion of the screw has a progressively increasing number of threads in frictional contact with the internal threads swaged in the work by the work entering end of the screw. The continued increase in driving torque is undesirable not only when manually driving the screws, but also when using clutch controlled power drivers. The clutches of such power drivers must be set sufficiently high to overcome the driving torque of the screw and yet sufficiently low to prevent stripping or breaking of the screw. It is accordingly desirable to maintain the maximum driving torque required for fully driving the screw into the workpiece as low and as uniform as possible to avoid the necessity of critical setting of the clutches on the power drivers.

SUMMARY OF THE INVENTION

The present invention provides an improved process for making a screw comprising, forming a headed blank with a straight shank of uniform penta-lobular cross-sectional shape and size from head to tip and having generally flat sides extending between angularly spaced lobes; rolling the blank on a centerless basis between contoured thread rolling dies having straight thread forming die surfaces that engage the main portion of the shank and tapered thread forming die surfaces that engage the work entering end portion of the shank; maintaining the straight thread forming die surfaces, where they are adapted to roll the thread to final shape, spaced apart a distance such that the crests of the threads rolled on the lobes of the main shank portion do not fill the roots of the thread grooves in the straight thread forming die surfaces to thereby form a helical thread having a uniform penta-lobular cross-sectional configuration through the main shank portion with incompletely finished crests at the lobes; the taper thread forming die surfaces converging in a direction toward the shank axis to roll threads on the work entering end portion having finished crests at the lobes that taper inwardly, the taper thread forming die surfaces displacing material from the work entering end portion of the blank toward the juncture of the straight and taper thread forming die surfaces to more completely fill the roots of the thread groove in the die surface in that region and form at least one sizing turn intermediate the work entering turns and shank turns which have crests at its lobes that are more completely finished and of greater radial height than the crests at the lobes of the shank turns.

The method of present invention forms an improved thread swaging screw having a tapered work entering end portion and a sizing portion and an elongated straight shank portion arranged in that order beginning at the free end of the shank and in which the shank turns have a penta-lobular cross-sectional configuration with uniform maximum root, pitch and crest radii at the lobes and uniform minimum root, pitch and crest radii at the sides and the same flank angle; the sizing turn has a penta-lobular configuration with maximum root and pitch radii at the lobes and minimum root and pitch radii at the sides the same as the corresponding radii of the shank turns and a maximum crest radii at the lobes and a minimum crest radii at the sides greater than the corresponding crest radii of the shank turns, and the work entering turns have a penta-lobular cross-section with maximum crest and pitch radii at the lobes and minimum crest and pitch radii at the sides that taper inwardly toward the shank axis. The shank turns have unfinished crests at the lobes and relatively wider unfinished crests at the sides and the sizing turns have more completely finished and preferably fully formed crests at the lobes and sides.

The thread swaging screw formed in accordance with the present invention requires only moderate torque to start tapping a hole in the workpiece; has a low run-in torque substantially below its starting torque when the screw is tapped into the short hole in a strip; has a moderate and generally uniform driving torque approximating its starting torque when the screw is tapped into a long or blind hole such as in a casting; has high holding power in the workpiece; is easy to start in a hole without requiring high axial starting pressure; reduces bellmouthing of the hole caused by stripping the threads in the workpiece when starting to thread a hole; and is economical to form.

These, together with other features and advantages of the present invention will become apparent for the following description when taken in connection with the accompanying drawings wherein:

FIG. 13 is a cross-sectional view of the blank of FIG. 3 showing the same on a larger scale;

FIG. 14 is a fragmentary longitudinal sectional view of the screw of FIG. 1 illustrating the same being tapped into a workpiece.

FIG. 15 is a diagrammatic cross-sectional view through the shank portion of the screw of FIG. 14 illustrating the root, pitch and crest radii of the shank turns; and FIG. 16 is a diagrammatic cross-sectional view through the work entering portion of the screw of FIG. 13 illustrating the root, pitch and crest radii of the work entering turn.

The thread forming screw of the present invention has a penta-lobular cross-section and the terms such as pitch diameter, crest diameter and root diameter commonly used in describing the threads on the screws of circular cross-sectional are not accurately descriptive of the threads on the screw penta-lobular cross-section since the transverse dimension of the screw varies circumferentially of the screw. Accordingly, in this application, the following definitions shall be applicable:

Pitch Radius: On a straight thread, the pitch radius is the radial distance between the longitudinal center-line of the screw and the surface of the coaxial pitch cylinder that would pass through the thread profiles at such points as to make the width of the groove equal to one half the basic pitch. On a taper thread, the pitch radius at a given position of the thread is a radial distance between the longitudinal center-line of the screw and a cone, the surface of which would pass through the thread profiles at such points as to make the width of the groove equal to one half the basic pitch.

Root Radius: The radial distance between the longitudinal center-line of the screw and the root of the thread at that point.

Crest Radius: The radial distance between the longitudinal center-line of the screw and the crest of the external thread on the screw at that point.

Lead Pitch: The distance measured parallel to the axis of the thread between corresponding points on adjacent thread forms in the same axial plane and on the same side of the axis.

Included Angle: The angle between the flanks of a thread measured in an axial plane.

Figure 1:
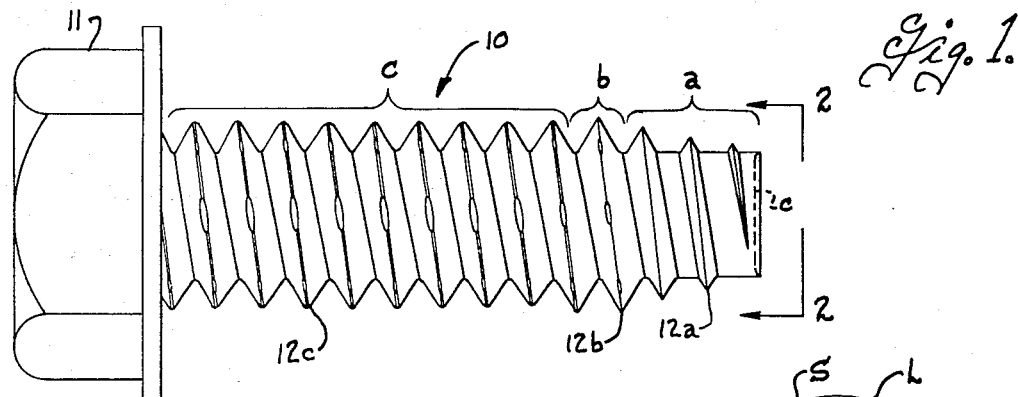
FIG. 1 is a side elevational view of a screw formed in accordance with the present invention.
Figure 2:
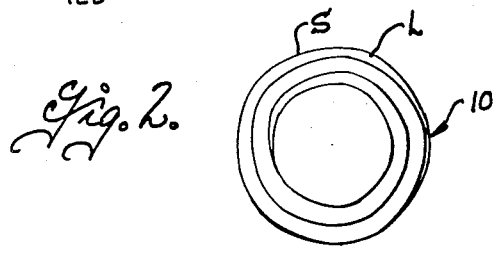
FIG. 2 is an end elevational view taken on the plane 2—2 of FIG. 1.
Figure 3:
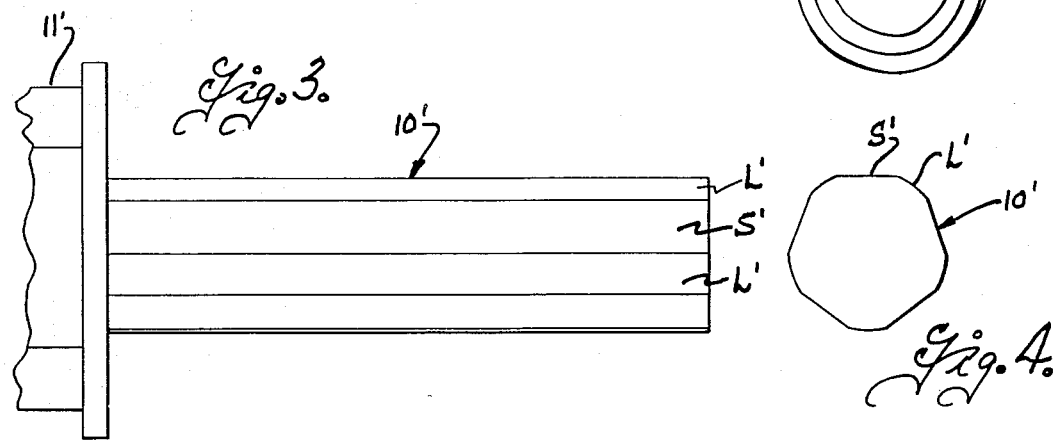
FIG. 3 is a side elevational view of a penta-lobular blank utilized in forming the screw of FIG. 1.

Reference is now made more specifically to FIGS. 1 and 2 of the accompanying drawings wherein there is illustrated a thread swaging screw having an elongated shank 10 and a driving head 11 at one end of the shank. The shank 10 has a tapered work entering end portion $a$, a sizing portion $b$, and an elongated straight shank portion $c$ arranged in that order beginning at the free end of the shank. The shank has a continuous external rolled thread extending therealong including a number of shank turns 12$c$ on the straight shank portion; at least one sizing turn 12$b$ on the sizing portion, and one or more work entering turns 12$a$ on the work entering end portion. The shank turns 12$c$, sizing turns 12$b$ and work entering turns 12$a$ each have a penta-lobular cross-section with five equally angularly spaced lobes L and a corresponding number of intermediate sides S with the root, pitch and crest radii of the turns varying circumferentially of the shank from a maximum root, pitch and crest radii at the lobes to a minimum root, pitch and crest radii at the sides.

Figure 4:
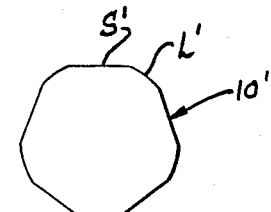
FIG. 4 is an end elevational view with a blank of FIG. 3.

The thread forming screw is made by first forming a headed blank having a shank 10' of uniform cross-sectional shape and sizing throughout its length, and a head 11' at one end of the shank. For reasons where to become apparent here and after, the shank 10' is formed with a penta-lobular cross-sectional configuration best shown in FIGS. 4 and 13 and has five equiangularly spaced lobes L' and a corresponding number of generally flat sides S' extending between adjacent lobes and so formed that the width of the blank is non-uniform. More particularly, the lobes designated L' preferably approximates arcs of a circle having a radius designated L$b$ in FIG. 13 and the sides designated S' are generally flat and extend between the adjacent lobes L, inwardly of a circular locus through the apices of the lobes L' and shown in broken lines at O in FIG. 13. The cross-sectional width of the above described blank is non-uniform throughout 360° and varies from a minimum designated W1 in FIG. 13 at each diametrical plane that bisects the sides S' and the lobes L' at opposite sides of the shank, to a maximum designated W2 in FIG. 13 at planes intermediate the aforementioned diameteral planes. The minimum width W1 measured from a lobe L' to a diametrically opposite side S', is made approximately equal to twice the pitch radius at the lobe of the screw to be rolled. The width of the flat sides S' is correlated with the radius of the blank at the lobes L' such that the difference between the maximum radius L$b$ and the minimum radius S$b$ is substantially less than one-half the thread depth and preferably about one-third the thread depth of the screw.

The headed blank 10' with a penta-lobular shank can be formed in any desired manner and may, for example, be formed by drawing a round wire or rod 15 through a draw die 16 having a penta-lobular cross-section substantially corresponding to the aforedescribed cross-sectional configuration of the shank 10' to be formed on the blank. The wire 15' of penta-lobular cross-section is then fed to a cut-off mechanism designated 18, such as the shear mechanism in the cold-heading machine having relatively moveable shear blade and quill 18a, 18b respectively for shearing off a length of penta-lobular stock sufficient to form a screw blank. The severed section of the penta-lobular wire are then transferred to heading dies 20a and 20b in the cold heading machine for forming the head 11' on the blank. As pointed out hereinafter, it is important that the shank portion 10' of the blank be of uniform cross-sectional shape and size. However, the heading operation tends to axially compress and radially expand the shank portion of the blank and, in order to assure a blank of uniform cross-sectional shape and size throughout the length of the shank, the heading die 20a is formed with an internal opening 20' having the desired cross-sectional shape of the shank 10', and which is either uniformly straight throughout the length of the shank or which has even a slight reverse taper with a minimum cross-section at the head end of the blank so that ejection of the blank from the heading die 20a by the ejector mechanism 20c will cause a slight extruding action on the shank portion of the blank to assure substantially uniform cross-sectional shape and size of the shank portion of the blank throughout its length.

Figure 9:
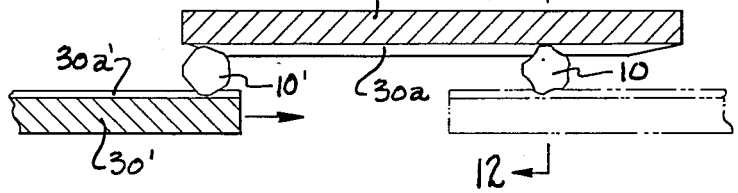
FIG. 9 is a diagrammatic view illustrating the rolling of screw blanks between a pair of thread rolling dies.
Figure 10:
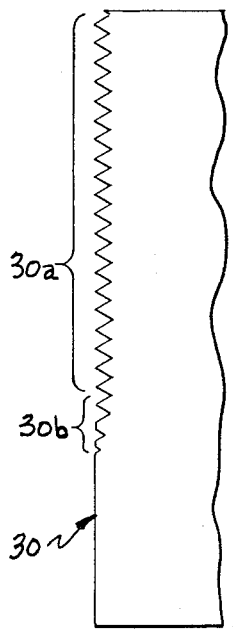
FIG. 10 is a plan view of one of the dies of FIG. 9.

The penta-lobular shank of uniform size throughout its length and of non-uniform angular width is then rolled on a centerless basis between relatively movable thread forming dies 30 and 30' have opposed thread forming die surfaces on the adjacent sides, which die surfaces are thread grooved in a direction transverse to the shank axis and oblique to the path of relative movement of the dies to form a helical thread on the shank. As diagrammatically shown on FIG. 9, one thread forming die 30 is stationary and the other thread forming die 30' is movable relative to the stationary die from the position shown in solid lines at the left in FIG. 9, along a path and in a direction indicated by the arrow relative to the stationary die in a manner to maintain a generally uniform spacing between the thread forming die surfaces, to a second position such as shown in phantom at the right in FIG. 9 where the finished screw is discharged from between the dies. For reasons pointed out more fully hereinafter, the thread grooved die surfaces are contoured in a direction longitudinally of the blank to have straight thread forming die surfaces 30a and 30a' that engage the main portion of the shank intermediate the work entering end portion and the head, and taper thread forming die surface 30b and 30b' that converge in a direction lengthwise of the shank thread the shank axis. As apparent from FIG. 10, the thread grooves in the taper thread forming die surfaces 30b and 30b' respectively merge with and form continuations of the thread grooves in the straight thread forming die surfaces 30a and 30a', so that the dies roll in a single continuous helical thread on the main shank portion and the work entering end portion of the screw.

Figure 12:
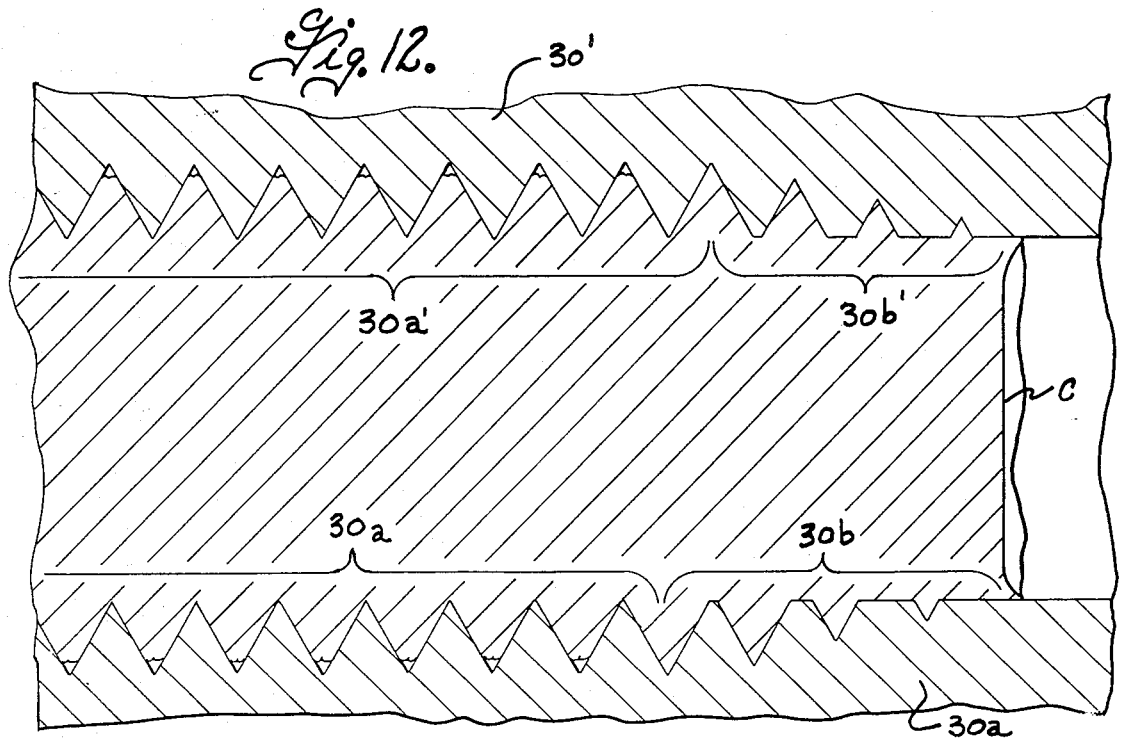
FIG. 12 is a fragmentary transverse sectional view taken on the plane 12—12 of FIG. 9 and illustrating the die and blank on the larger scale.
Figure 5:
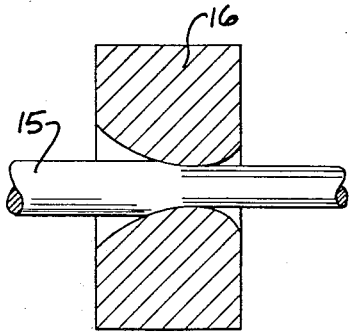
FIG. 5 is a fragmentary sectional view illustrating a length of wire being drawn through a die to reform the same to a penta-lobular cross-section.
Figure 7:
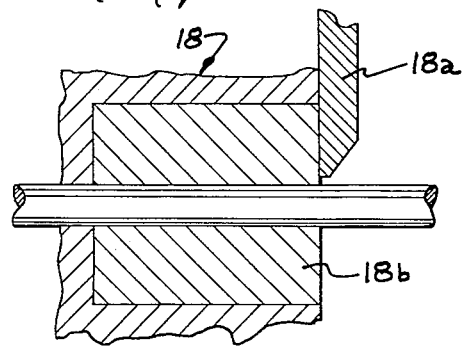
FIG. 7 is a sectional view illustrating the cut-off mechanism of a conventional cold heading machine.
Figure 8:
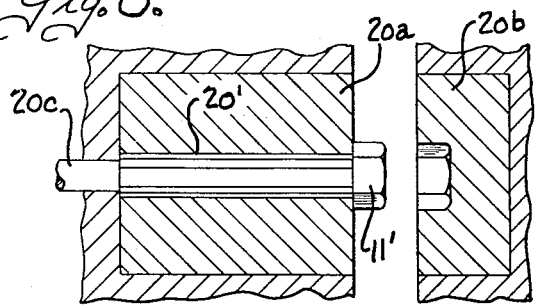
FIG. 8 is a view partly in section illustrating the heading station of a cold heading machine.
Figure 6:
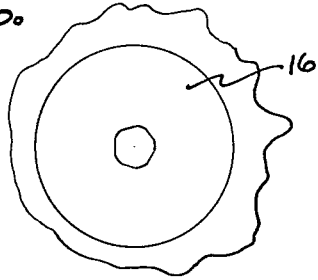
FIG. 6 is an end elevational view of the die of FIG. 5.
Figure 11:
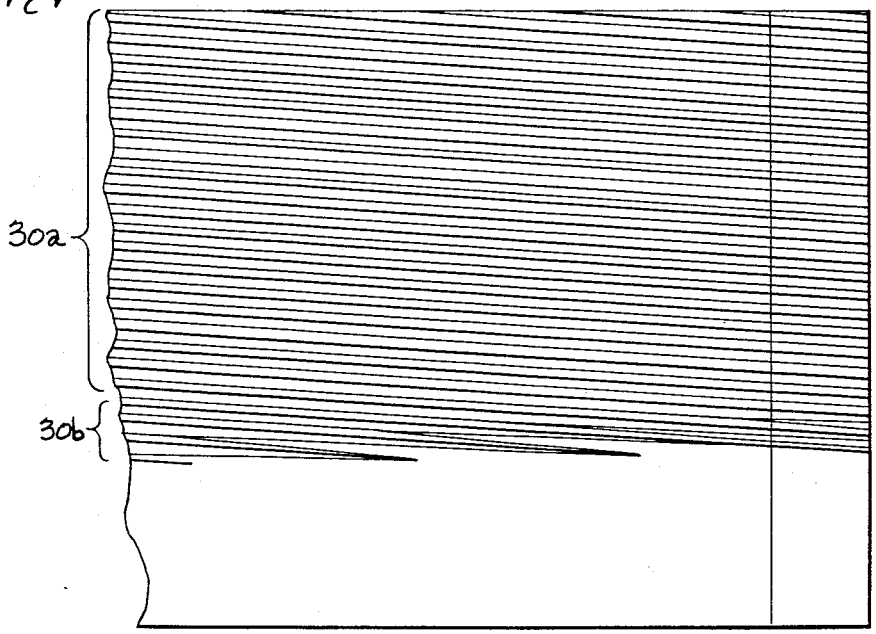
FIG. 11 is an end elevational view of the die of FIG. 10.

The thread grooves in the thread forming die faces of the dies 30 and 30' are of uniform profile and may, for example, be of the sharply crested V configuration shown in FIGS. 11 and 12. Alternatively, the threads can be of other thread profiles such as a modified V configuration with flat or arcuate crests and/or roots. During rolling of the shank between the thread rolling dies, the crests of the threads on the dies are forced into the body of the shank and, in turn, displace some of the shank body outwardly towards the roots of the thread grooves in the dies. During rolling of the blank, the straight thread forming die surfaces, at least at the outlet portion where the die surfaces are adapted to roll the threads to the final shape, are maintained in planes that are parallel to the axis of the blank and to each other so that the crests, pitch lines and roots of the thread grooves in the straight thread forming die surfaces 30a, 30a' are relatively parallel to each other. However, the straight thread forming die surfaces are maintained spaced apart a distance such that the crests of the threads rolled on the lobes of the main shank portion do not fill the roots of the thread grooves in the straight forming die surfaces, to thereby form a helical thread on the main shank portion having a uniform penta-lobular cross-sectional configuration throughout the main shank portion, but with incompletely finished crests at the lobes.

The taper thread forming die surfaces, at least in the region where they are adapted to roll the threads to the final shape, have the roots and pitch line of the thread grooves therein disposed in planes that converge in a direction lengthwise of the shank, that is cross-wise of the direction of relative movement of the dies, toward the axis of the shank to roll a thread on the work entering end portion having a penta-lobular cross-sectional configuration with finished crests at the lobes that taper inwardly toward the shank axis. The dies 30 and 30' can be of the so-called type W dies in which the crests of the threads on the taper thread forming dies surfaces are disposed approximately in the plane of the crests of the threads on the straight thread forming die surface, as thus shown in FIGS. 11 and 12, so as to roll a taper thread on the work entering end portion of the blank in which the threads have a decreasing height and maximum and minimum root radii respectively equal to the maximum and minimum root radii of the shank turns. Alternatively, the contoured thread rolling dies can be of the so-called type F dies which are similar to the type W dies, but have the crests of the threads on the taper thread forming portion of the dies disposed in relatively converging planes so as to roll a taper thread on the work entering end portion of the screw having threads of generally uniform height.

The use of contoured thread rolling dies to roll a tapered thread on a longitudinally straight penta-lobular blank causes some of the material in the work entering end portion of the blank to be forced axially of the blank toward the juncture of the taper and straight thread forming die surfaces to thereby more completely fill the roots of the thread grooves in that region and form at least one sizing turn of penta-lobular cross-sectional configuration at the juncture of the main and work entering end portion. The sizing turn has crests at the lobes and sides which are respectively more completely finished and of greater radial height than the crests at the lobes and sides of the main shank portion.

The amount of material displaced during rolling the taper thread on the work entering end portion of the screw, and therefore the pressure on the material at the work entering end portion of the screw, increases with increased extension of the free end of the blank into the taper thread forming die surfaces. The free end of the blank is extended into the taper thread forming die surfaces to roll at least several tapered thread turns thereon and sufficient to form crests at the lobes of the sizing turn that are substantially more completely finished and of greater radial height than the crests of the threads at the lobes of the shank turns and preferably, the preferrably, on the sizing turn are fully finished, at least at the lobes and have a lobular crest radius of the order of 0.001 inch larger than the lobular crest radius of the shank turns. The material of the work entering end not only flows toward the juncture with the straight shank portion, but also flows toward the free end of the screw and, when the taper thread forming die surfaces roll a taper on the work entering end of the screw sufficient to form an enlarged sizing turn, there is a pronounced "cupping" C at the free end of the screw, as shown in FIGS. 1, 12 and 14.

The above described method produces a screw in which the shank turns 12c, sizing turns 12b and work entering turns 12a have a penta-lobular cross-section with five circumferentially spaced lobes L and a corresponding number of intermediate sides S, with the root, pitch and crest radii of the turns varying circumferentially of the shank from the maximum root, pitch and crest radii at the lobes respectively designated $Lr$, $Lp$ and $Lc$, to a minimum root, pitch and crest radii at the sides respectively designated $Sr$, $Sp$ and $Sc$.

Since the penta-lobular blank is rolled on a centerless basis between the relatively parallel thread rolling dies, the penta-lobular root cylinder of the shank turns, defined by straight lines parallel to the blank axis passing through the thread profiles at the roots of the shank turns, and the penta-lobular pitch cylinder of the shank turns 12c defined by straight lines passing through the thread profile of the shank turns at such points as to make the width of the thread groove equal to one-half the lead pitch, have a uniform cross-sectional width throughout 360°. Further, the roots of the shank turns are circumferentially convex at the apices of the lobes and have a radius of curvature at the apices of the lobes which is less than the root lobe radius $Lr$ and the roots of the shank turns at the sides have a radius of curvature which is greater than the root side radius $Sr$. The crest of the shank turns 12c are slightly unfinished at the lobes and, since the shank 10' of the blank from which the screw is formed had a cross-section of non-uniform width throughout 360°, the crests of the shank turns 12c at the sides are also finished to a greater degree than the lobe crests and are axially relatively wider than the crests at the lobes. As shown in FIG. 15, the crests of the shank turns at the sides S are circumferentially concave and provide radially relieved areas intermediate adjacent lobes.

The sizing turn 12b has the same pitch and flank angle as the shank turns and has the same maximum and minimum root radius $Lr$ and $Sr$ as the shank turns and similarly has the same maximum and minimum pitch radius $Lp$ and $Sp$ as the shank turns. However, the crests of the sizing turn are more completely finished and have a larger radial height so that the maximum crest radius $Lc'$ at the lobe of the sizing turn is greater than the maximum crest radius $Lc$ of the shank turn and, similarly, the minimum crest radius $Sc'$ at the sides of the sizing turn is greater than the minimum crest radius $Sc$ at the sides of the shank turns. The sizing turn is advantageously formed so as to have a fully finished crest at the lobes and at least substantially finished crests at the sides.

The work entering turns also have a penta-lobular cross-section with crests that are fully finished at least at the lobes and along the major portion of the sides, and with a maximum crest radius and pitch radius that progressively decreases toward the end of the screw to provide a tapered helical thread. In the embodiment illustrated, the root radius of the work entering turns 12a is substantially equal to the root radius of the shank and sizing turns. It is to be understood, however, that the root radius of the work entering turns can also be arranged to taper inwardly if type F dies are used.

The penta-lobular cross-sectional configuration of the screw provides five circumferentially spaced lobes with intermediate relief areas at the sides to swage threads in a workpiece such as shown at 40 in FIG. 14. The workpiece is formed with an opening 40a having a diameter slightly greater than twice the pitch radius $Lp$ at the lobes of the sizing and shank turns, and the screw, when turned into the opening 40a will swage internal threads in the workpiece.

FIG. 14 is a fragmentary sectional view illustrating use of the screw 10 of the present invention to tap the hole 40a in the workpiece 40. As previously described, the hole 40a in the workpiece has a radius slightly larger than the maximum pitch radius $Lp$ of the screw, and the crests of the work entering turns 12a taper inwardly to a maximum crest radius no larger than the radius of the hole so that at least a portion of the initial work entering turn can extend into the untapped hole to start the screw. As the screw is turned in the untapped hole, the addendum portions of the work entering turns 12a are forced outwardly into the material of the workpiece 40 and correspondingly displace a portion of this material inwardly toward the dedendum of the threads in the screw. Since the pitch and crest radii of the work entering turns 12a progressively increase in a direction toward the sizing turn, the lobes on the work entering turns are forced progressively deeper into the material of the body and correspondingly force more of the material of the workpiece inwardly toward the dedendum of the threads in the screw. The sizing turn 12b will swage an internal thread in the workpiece having a root radius (one-half the root diameter) substantially equal to the crest lobe radius $Lc'$ of the sizing turn and, since the crest lobe radius $Lc$ of the shank turns is less than that of the sizing turn, there is a slight radial clearance shown at 40a' in FIGS. 14 and 15, preferrably of the order of 0.001, between the crests of the shank turns and the roots of the internal threads formed in the workpiece. However, since the lobe pitch radius $Lp$ and lobe root radius $Lr$ of the shank turns 12c are respectively the same as the lobe pitch radius and lobe root radius of the sizing turn 12b, the flanks of the shank turns at the lobes will have a close fit with the internal thread formed in the workpiece.

The crest radii $Sc$, pitch radii $Sp$ and root radii $Sr$ at the sides of the screw are less than the corresponding crest radii $Lc$, pitch radii $Lp$ and root radii $Lr$ at the lobes so that the sides of the screw are spaced inwardly from the internal thread swaged in the workpiece by the lobes of the screw. This not only reduces the area of frictional contact between the threads on the screw and the threads formed in the workpiece, but also provides relief areas intermediate the lobes in the screw.

A screw formed in accordance with the present invention has a relatively low run-in torque when tapped in short holes such as in a strip. The following tests were conducted by the testing laboratory of an independent electrical equipment manufacturing company. The starting, driving and stripping torques of a commercially available No. 10-32 × ⅝ inch tri-lobular screw ("Taptite") and a No. 10-32 × ⅝ inch penta-lobular screw formed with a sizing turn as described above, when threaded into holes in a ⅛ inch zinc casting test strip.

| 10-32 × ⅝" (3 Lobe-Waxed) | | | 10-32 × ⅝" (5 Lobe Oil Dip) | | |
|---|---|---|---|---|---|
| AVERAGE OF: | START | DRIVE | AVERAGE OF: | START | DRIVE |
| Sample 1 | 11.00 | 7.00 | Sample 1 | 12.00 | 2.25 |
| Sample 2 | 12.50 | 7.50 | Sample 2 | 11.25 | 3.25 |
| Sample 3 | 11.75 | 6.75 | Sample 3 | 13.50 | 3.75 |
| Sample 4 | 13.50 | 7.50 | Sample 4 | 12.50 | 3.00 |
| Sample 5 | 11.50 | 3.50 | Sample 5 | 11.00 | 3.00 |
| TOTAL AVERAGE | 12.05 | 7.45 | TOTAL AVERAGE | 12.05 | 3.81 |

While the starting torque of the tri-lobular and the penta-lobular screws were of similar magnitude, the driving torque in short holes of the penta-lobular screw with a sizing turn averaged about half the driving torque of the commercially available tri-lobular screw.

A screw formed in accordance with the present invention also has a lower driving torque when tapped into long holes such as in castings. The following tests were conducted by the testing laboratory of an independent manufacturer of power driven tools, comparing driving torque of a commercially available 10 × 24 × ¾ inch tri-lobular screw ("Taptite") and a 10 × 24 × ¾ inch penta-lobular screw with a sizing turn formed in accordance with the present invention, when threaded into a long hole in an aluminum casting.

| HOLE | DRIVE (in. lb.) | |
|---|---|---|
| | TRI-LOBULAR | 5 SIDED THREAD |
| 1 | 20 | 11 |
| 2 | 19 | 25 |
| 3 | 12 | 13 |
| 4 | 12 | 13 |
| 5 | 23 | 13 |
| 6 | 19 | 19 |
| 7 | 27 | 9 |
| 8 | 12 | 12 |
| 9 | 25 | 13 |
| 10 | 21 | 13 |
| 11 | 14 | 13 |
| 12 | 23 | 13 |
| *AVERAGE | 18.8 | 13.3 |

*Of the 12 values listed, the high and low values were disregarded when obtaining these averages.

As will be seen, in the above test the average driving torque of the penta-lobular screw with a sizing turn was about 50 percent less than that of the commercially available tri-lobular screw.

Thus, when the screw of the present invention is tapped into a short hole such as in a plate or strip, the driving torque decreases to a relatively low value after the sizing turn passes through the plate. This is particularly advantageous in electrical terminal screws since the greater portion of the limited torque available for tightening the screw is used to provide increased clamping force instead of merely overcoming resistance to turning of the screw in the workpiece. Moreover, when the screw is turned in the reverse direction, the sizing turn imposes additional resistance to turning when it again enters the tapped hole in the strip so as to form a releasable captive screw.

When the screw is tapped into a long or blind hole of uniform size in a casting, the torque remains generally uniform. However, if the long hole has a substantial taper, then some increase in driving torque does occur as the work entering end of the screw progresses toward the small end of the hole. As is conventional, the screws are heat threaded after rolling of the threads to harden the same.

We claim:

1. A method of making a thread forming screw of penta-lobular cross-section having a straight main shank portion and a tapered work entering end portion and an intermediate radially enlarged sizing portion comprising:

a. providing a headed blank having a straight shank of uniform cross-sectional shape and size from the head to the tip of the shank and which cross-section has a penta-lobular configuration with five equi-angularly spaced lobes and five generally flat sides each extending between adjacent lobes and disposed inwardly of a circular locus through the apices of the lobes, b. rolling a main portion of the shank intermediate the head and the work entering end portion on a centerless basis between opposed straight thread forming die surfaces which are thread grooved oblique to the shank axis to form a helical thread thereon, and maintaining the roots of the thread grooves in the straight thread forming die surfaces, where they are adapted to roll the thread to the final shape, in planes parallel to each other and spaced apart a distance such that the crests of the threads rolled on the lobes of the main shank portion do not fill the roots of the thread grooves in the straight thread forming die surfaces whereby to form a helical thread on the main shank portion having a uniform penta-lobular cross-sectional configuration throughout the main shank portion with incompletely finished crests at the lobes, c. while rolling the main shank portion between the straight thread forming die surfaces simultaneously rolling the work entering end portion of the shank on a centerless basis between opposed taper thread forming die surfaces thread grooved obliquely to the shank axis to join with thread grooves in a respective straight die surface, the roots of which thread grooves in the taper thread forming die surface, where they are adapted to roll the thread to the final shape, being disposed in planes that converge in a direction lengthwise to the shank toward the shank axis to roll a thread of penta-lobular cross-sectional configuration on the work entering end portion having finished crests at the lobes that taper inwardly, displacing material from the work entering end portion of the shank toward the juncture of the straight and taper thread forming die surfaces to thereby more completely fill the roots of the thread grooves in that region and form at least one sizing turn of penta-lobular cross-sectional configuration at the juncture of the main and work entering end portions having crests at the lobes and sides which are respectively more completely finished and of greater radial height than the crest at the lobes and sides of the main shank portion.

2. The method of claim 1 wherein the crests of the threads of the thread grooves in the taper thread forming die surfaces are disposed in substantially the same plane as the crests of the thread grooves in the straight thread forming die surface whereby the work entering turns have maximum and minimum root radii respectively equal to the maximum and minimum root radii of the shank turns.

3. The method of claim 1 wherein the free end of the shank of the blank is extended into the taper thread forming die surfaces, during rolling of threads on the work entering end portion, sufficient to form fully finished crests at lobes of the sizing turn.

4. The method of claim 1 wherein the difference between the crest lobe radii of the sizing turn and the crest lobe radii of the shank turns is of the order of 0.001.

5. The method of claim 1 wherein the minimum cross-sectional dimension of the blank measured from a lobe to the diametrically opposite generally flat side is selected to be approximately equal to twice the lobular pitch radius of the screw.

6. The method of claim 1 wherein the lobes on the blank are circumferentially arcuate with an arc radius substantially equal to their radial spacing from the axis of the blank.

7. The method of claim 6 wherein the minimum cross-sectional dimension of the blank measured from a lobe to the diametrically opposite generally flat side is selected to be approximately equal to twice the lobular pitch radius of the screw.

* * * * *